(12) United States Patent
Johnson

(10) Patent No.: US 10,717,579 B2
(45) Date of Patent: Jul. 21, 2020

(54) MODIFIED ASEPTIC FRONT PULL PIERCING VALVE ASSEMBLY

(71) Applicant: Liqui-Box Corporation, Richmond, VA (US)

(72) Inventor: James W. Johnson, Delaware, OH (US)

(73) Assignee: LIQUI-BOX CORPORATION, Richmond, VA (US)

( * ) Notice: Subject to any disclaimer, the term of this patent is extended or adjusted under 35 U.S.C. 154(b) by 0 days.

(21) Appl. No.: 16/688,120

(22) Filed: Nov. 19, 2019

(65) Prior Publication Data

US 2020/0079568 A1    Mar. 12, 2020

Related U.S. Application Data

(60) Division of application No. 15/958,036, filed on Apr. 20, 2018, now Pat. No. 10,513,382, which is a continuation of application No. 15/178,666, filed on Jun. 10, 2016, now Pat. No. 9,975,681.

(60) Provisional application No. 62/173,576, filed on Jun. 10, 2015.

(51) Int. Cl.
| | |
|---|---|
| *B65D 77/06* | (2006.01) |
| *B67D 3/04* | (2006.01) |
| *B65D 47/20* | (2006.01) |
| *B65D 53/02* | (2006.01) |
| *F16K 1/00* | (2006.01) |

(52) U.S. Cl.
CPC ....... *B65D 77/067* (2013.01); *B65D 47/2018* (2013.01); *B65D 53/02* (2013.01); *B67D 3/045* (2013.01); *F16K 1/00* (2013.01)

(58) Field of Classification Search
CPC .............. B65D 77/065; B65D 77/067; B65D 47/2018; B65D 47/2093; B65D 53/02; B67D 3/045; F16K 1/00
See application file for complete search history.

(56) References Cited

U.S. PATENT DOCUMENTS

| | | | |
|---|---|---|---|
| 4,076,147 A | 2/1978 | Schmit | |
| 4,325,496 A | 4/1982 | Malpas | |
| 4,602,725 A | 7/1986 | Malpas et al. | |
| 4,997,108 A | 3/1991 | Hata | |
| 5,337,775 A | 8/1994 | Lane et al. | |
| 6,378,730 B1 | 4/2002 | Reddy et al. | |
| 7,980,424 B2 | 7/2011 | Johnson | |
| 8,002,145 B2 | 8/2011 | Anjos | |

(Continued)

FOREIGN PATENT DOCUMENTS

| | | |
|---|---|---|
| AU | 537016 B2 | 5/1984 |
| DE | 3412240 A1 | 10/1985 |

(Continued)

*Primary Examiner* — Nicholas J. Weiss
(74) *Attorney, Agent, or Firm* — BakerHostetler

(57) ABSTRACT

A front pull piercing valve assembly attached to a flexible container, whereby; when the wall of the flexible container is pulled into contact with a piercing element in the assembly, the contents of the container are dispensed by piercing the wall of the container and liquid flows through the valve assembly and directly into a container or through flexible hose or another connection to be dispensed. The valve assembly is configured in such a manner that during use it is filed with the liquid being dispensed thereby preventing the liquid in the flexible container from being exposed to air, namely, oxygen that often causes spoilage of certain liquids, such as wine.

6 Claims, 3 Drawing Sheets

(56) References Cited

U.S. PATENT DOCUMENTS

| | | |
|---|---|---|
| 9,604,836 B2 | 3/2017 | Nini |
| 2006/0144852 A1 | 7/2006 | Dubach |
| 2009/0046958 A1 | 2/2009 | Keen et al. |
| 2017/0107094 A1 | 4/2017 | Van Der Molen et al. |

FOREIGN PATENT DOCUMENTS

| | | |
|---|---|---|
| EP | 0171870 A1 | 2/1986 |
| EP | 0402310 A1 | 12/1990 |

MODIFIED ASEPTIC FRONT PULL PIERCING VALVE ASSEMBLY

CROSS REFERENCE TO RELATED APPLICATIONS

This application is a divisional of U.S. patent application Ser. No. 15/958,036, filed Apr. 20, 2018, which is a continuation of U.S. patent application Ser. No. 15/178,666, filed Jun. 10, 2016, which claims the benefit of U.S. Provisional Application No. 62/173,576, filed Jun. 10, 2015, the entireties of which are incorporated by reference herein for any and all purposes.

TECHNICAL FIELD

This invention relates to a fitment assembly for use with flexible containers for flowable materials, such as liquids, in aseptically-packaged flexible containers.

BACKGROUND

Flexible polymeric containers are extensively used throughout the food service industry for storing and dispensing soft drink syrups and other such beverages, as well as wine, dairy products, enteral feeding solutions, fruit juices, tea and coffee concentrates, puddings, cheese sauces, and many other flowable materials, including those that must be filled aseptically. Flexible polymeric containers typically have walls made of polymeric films with either a monolayer or multiple layer structure. The particular polymers constituting the container film layers vary depending on the type of material to be placed in the container. The film layers usually include an oxygen barrier layer to prevent contact between the aforementioned materials and oxygen or other gases. The walls of the container may be metallized, or coated with a metallic layer such as aluminum to prevent incursion of oxygen or other gases.

The flexible polymeric containers may have inlets and/or spouts for filling and dispensing the container contents. The containers are often placed within a corrugated paper box. Such packaging systems are commonly referred to as "bag-in-box" systems wherein the spout extends through an opening in the box to dispense the contents. Bag-in-box packaging systems are often used in restaurants, institutional food service centers, and convenience stores to facilitate service of liquid food products such as syrups, toppings, condiments, beverages and dairy products. These containers typically have a capacity of 1 to 6 gallons.

Once the container is filled with a desired flowable material, the spout is capped to seal the container and protect the contents from contamination. Depending on the type of contents, the container, spout and cap may be sterilized using steam, hydrogen peroxide ($H_2O_2$), radiation or other suitable sterilizing methods prior to, during and after filling. In order to maximize the shelf life of such products, it is crucial that fitment assemblies provide a hermetic seal for the entire life cycle of the container.

One convenient method of dispensing the contents of flexible containers is to open the containers by piercing the cap used to seal the container or by piercing the container directly using a fluid transfer device. Examples of dispensing systems that use piercing are disclosed in the following U.S. Pat. Nos. 4,325,496, 6,378,730 and 7,980,424. A technique generally used in such dispensing systems is force the piercing element through the film of the flexible container. Disadvantages of this technique are that when the piercing element is forced too far into the container, it can pierce the opposite wall of the container and cause a leak and prevent the container from resealing and thereby resulting in spoilage of the product in the container. Also, if the wall of the container is not pierced, contact with the wall can substantially weaken the wall and later result in a break since often these flexible containers are subjected to stressful handling. An additional problem is exposure of the liquid to air once the flexible container is opened and reopened. A valve assembly is required that prevents the incursion of air into the container after opening and closing. For example, wine is particularly susceptible to spoilage caused by oxidation and the valve assembly is required to prevent the exposure to air while the container is in constant use.

Usually, flexible containers are intended for one-time use and are discarded once the contents of such containers have been completely dispensed; the fitment assembly must be made of inexpensive material, easy to manufacture, quick to market and preferably recyclable. It is also desirable that the fitment assembly for use with such packaging systems simplifies access to the container's contents while also minimizing the potential for contamination of the contents. It is desirable that the fitment assembly can be adapted to standard flexible hoses or tubes. The dispensing mechanism must be reliable such that dispensing of the contents is achieved without wasting the liquid through leakage or uncontrolled opening of the connection component and the like.

SUMMARY

The present invention provides a front pull piercing valve assembly that is attached to a flexible container, whereby; when the wall of the flexible container is pulled into contact with a piercing element in the assembly, the contents of the container are dispensed by piercing the wall of the container and liquid flows through the valve assembly and directly into a container such as a glass, pitcher or other container or through flexible hose or another connection to be dispensed. The valve assembly is configured in such a manner that during use it is filed with the liquid being dispensed thereby preventing the liquid in the flexible container from being exposed to air, namely, oxygen in the air that often causes spoilage of certain liquids, such as wine.

An aseptic front pull piercing valve assembly for a thin film flexible container containing a liquid comprising:

(A) a spout assembly having a longitudinal through internal passage and a sealing flange sealed to the film of the flexible container and having positioned therein a circular piercing element with a through internal passage and having a circular piercing end with at least one piercing point transversely positioned in the longitudinal passage in close proximity to the film of the flexible container;

(B) a threaded plug having a top and bottom and having a longitudinal through internal passage and a threaded exterior being fitted into the through internal passage of the spout assembly and the bottom of the plug being sealed to the film of the flexible container;

(C) a threaded collar having a longitudinal internal passage and threaded on the interior of the longitudinal passage and positioned in the internal passage of the spout assembly and threadably engaged with the threaded exterior of the threaded plug;

(D) a valve body having an outlet opening for dispensing liquid from the flexible container centrally positioned in the threaded collar;

(E) an interior fitment positioned in the valve body having a valve assembly that allows for flow of liquid from the flexible container when in an open position and when closed forms a seal to prevent air from contacting liquid in the valve body and flexible container;

(F) a valve actuator having a valve stem for opening and closing the valve assembly and a handle attached thereto for manual valve operation;

wherein said threaded plug being sealed to the film of the flexible container and positioned in the internal passage of the spout assembly and wherein the circular piercing element and the threaded exterior of the plug being engaged with the threaded interior of the collar; and whereby when engaging the threaded collar to move the threaded plug sealed to the film of the container thereby forcing the threaded plug to move away from the film of the flexible container thereby bringing the piercing end of the piercing element into engagement with the film and thereby piercing the film and allowing the liquid from the flexible container to flow out of the container and through the longitudinal interior of the spout assembly and into the valve body and valve assembly whereby opening of the valve of the valve assembly allows fluid to flow through the outlet opening of the valve body.

The aseptic front pull piercing valve assembly is easy to use since a relatively minimal amount of force is required for piercing and establishing fluid transfer. This assembly may be used, for example, with flexible containers that are filled or that are formed and filled using suitable commercial packaging systems known in the art. Such packaging systems may include vertical form film seal filling machines sold under the trade-marks PREPAC, IMPACO and ELECSTER, and the Liqui-Box™ Filler Model 2000C1T-A that is used for filling flexible containers used in bag-in-box systems. The assembly may also be used with flexible containers that are aseptically filled and in particular for liquids, such as wine, that are frequently sold in bag in the box assemblies or used in commercial enterprises that dispense, for example, many glasses of wine over an extended period. The construction of the assembly seals in the liquid in the flexible container and prevents oxidation of the liquid that occurs over time when exposed to the atmosphere.

In another embodiment of the invention, the leading tooth of the piercing point may comprise an exterior surface that is substantially parallel to the longitudinal axis of the hollow body and an interior surface that is inclined inwardly and forms an angle of 10° to 45° with the exterior surface.

Advantageously, the piercing end of the assembly may further comprise a plurality of additional teeth that are disposed around the peripheral extremity. The additional teeth facilitate piercing as they reduce the amount of force that is required for piercing the film of the flexible container and causing a circular film membrane within the pierceable portion to be peeled back in order to establish fluid transfer.

DETAILED DESCRIPTION OF ILLUSTRATIVE EMBODIMENTS

Referring particularly to the drawings, the figures are for the purpose of illustrating the present invention only and not for the purpose of limiting the scope of any claims.

Figure 1:
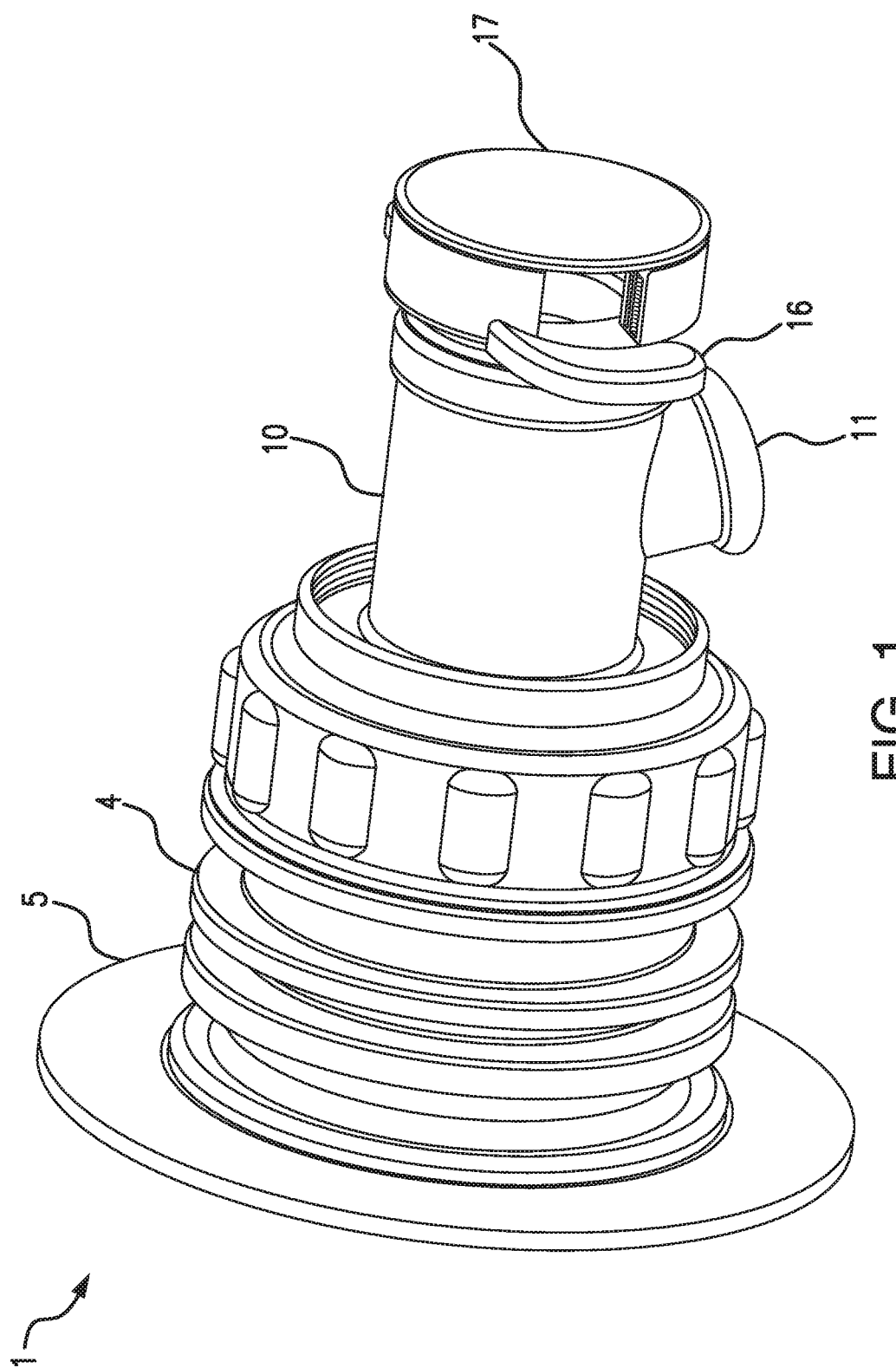
FIG. 1 shows a side perspective view of the aseptic front pull piercing valve assembly according to one embodiment of this invention.

FIG. 1 illustrates aseptic front pull piercing valve assembly shown generally at 1 according to the invention for use with flexible containers containing flowable materials, such as liquids or semi-solids, and particularly for aseptically-packaged flexible containers. The assembly 1 comprises a spout assembly 4 having positioned therein a valve body 10 having an outlet or exit opening 11. Attached to the valve body 10 is a handle 16 to actuate a valve in the valve body 10 and a cap 17 positioned over the handle. The spout assembly 4 has a flange 5 the bottom of which is sealed to a flexible container (not shown). Sealing to the flexible container which usually is a bag film is accomplished by conventional methods, such as heat sealing, adhesive or the like.

Figure 2:
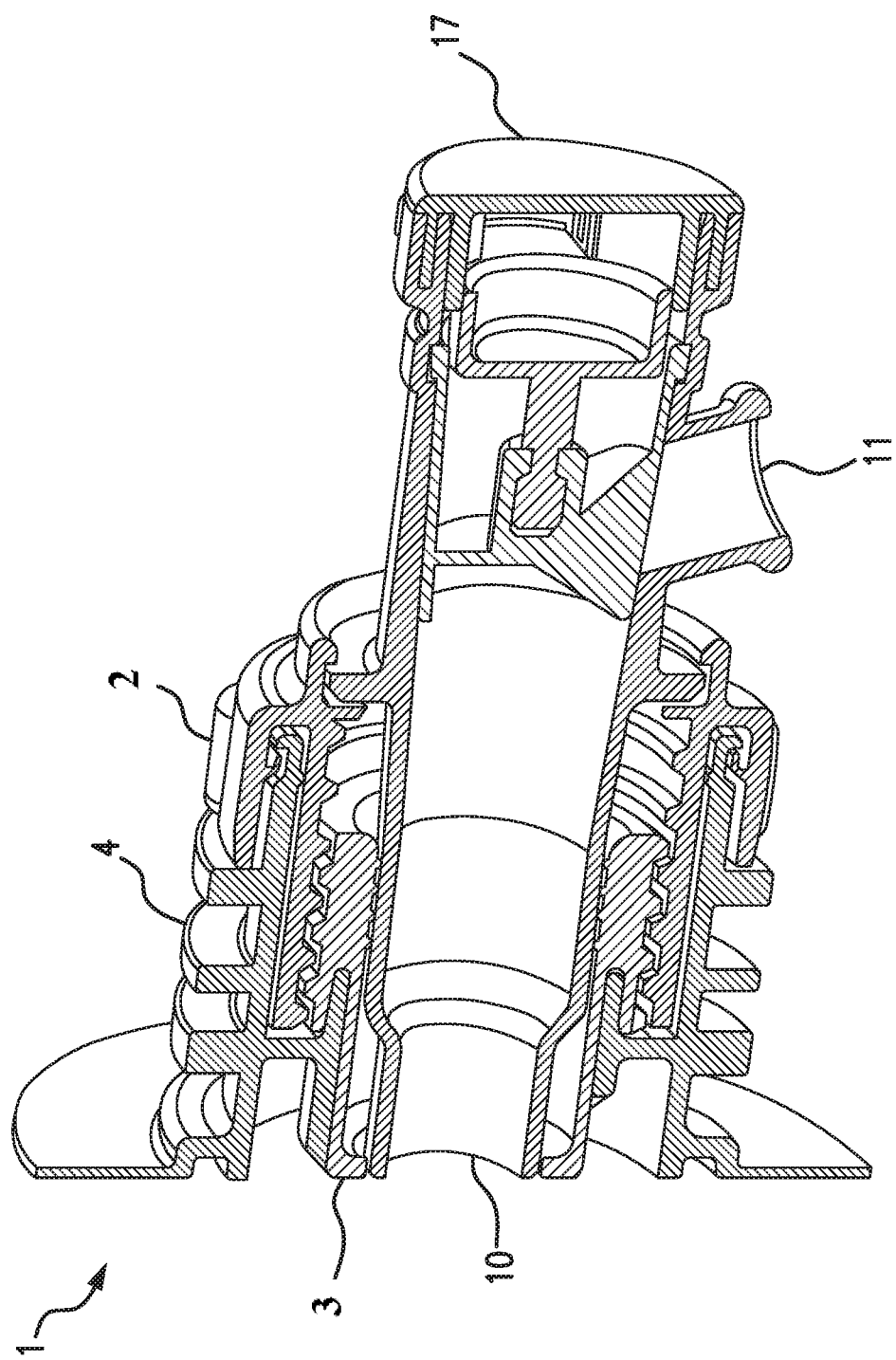
FIG. 2 shows a cross-section side view of the aseptic front pull piercing valve assembly according to one embodiment of this invention.

FIG. 2 shows a cross-sectional side view of the aseptic front pull piercing valve assembly 1. Threaded plug 3 is positioned in the spout assembly 4. Threaded collar 2 is threaded into the center of threaded plug 3. Valve body 10 having exit opening 11 is positioned in the threaded collar 2. Cap 17 is position on valve body 10.

Figure 3:
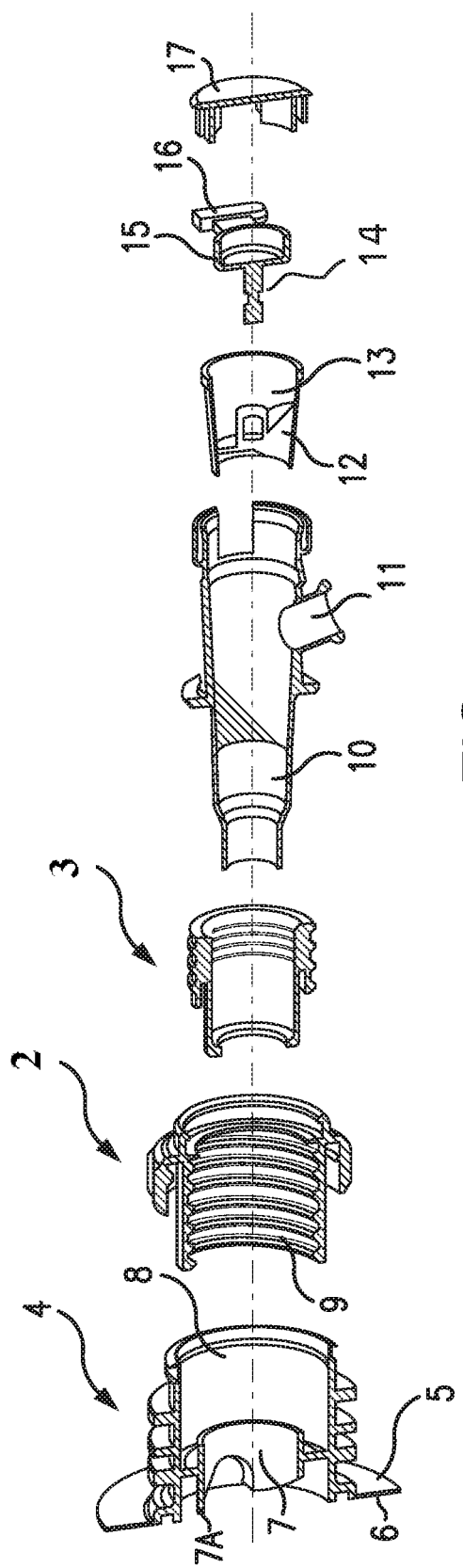
FIG. 3 shows a cross-section of the aseptic front pull piercing valve assembly in a disassemble state according to one embodiment of this invention.

FIG. 3 shows a cross-section of the aseptic front pull piercing valve assembly 1 in a disassembled state. The spout assembly 4 having a central opening 8 has centrally positioned therein at its annular end a piercing element 7 having a point 7A for piercing the film of the flexible bag or container (not shown). The bottom surface 6 of the sealing flange 5 is sealed to the flexible bag film or container and holds the film in place. Threaded plug 3 is positioned in the center of the spout assembly 4 and the annular edge 9 of threaded plug 3 is sealed to the flexible bag film. Threaded collar 2 is threaded into the threaded plug 3 and when engaged, i.e. turned, it pulls threaded plug 3 having the film attached away from the flexible bag and into contact with the piercing element 7 and its piercing point 7A thereby puncturing the film and allowing fluid from the bag or container to flow into the valve body 10 positioned in the threaded collar 2 and out to a container through exit opening 11 in the valve body when the valve assembly consisting of 12, 13, 14 and 15 is opened. An interior fitment of the valve body 12 having a valve seat 13 is positioned in the valve body 10. Valve stem 14 is engaged with the valve seat 13 and engaged and disengaged with the valve actuator 15 by the handle 16 attached thereto. Cap 17 covers the valve actuator.

The piercing element 7 that is positioned in the central opening 8 of the spout assembly 4 can be a molded part of the assembly 4 and molded into the central opening 8. Optionally, the piercing element 7 can be a separate element positioned in the central opening 8 and attached to the wall at one point or more of the central opening 8 and formed of a different material than the spout assembly 4 depending on the type of material of the flexible container that is to be pierced.

The configuration of the spout 4 shown in FIGS. 1-3 is widely-used, commercially available and is conventionally adapted for mounting to a flexible bag, typically used "bag-in-box" containers. It is understood that the piercing fitment assembly of the present invention could easily be modified to use other configurations of spouts. An alternative piercing element used in place of the piercing element 7 shown, in FIGS. 2 and 3. U.S. Pat. No. 7,980,424, which is hereby incorporated by reference, illustrates such an alternative piercing element. For example, the piercing element may comprise multiple piercing points such as a total number of 3, 5, 7, 10 etc. Other designs of piercing elements can also be used. Also, FIGS. 15 A, 15 B, 16 A and 16 B of '424 illustrate a prior art method of piercing a film of a flexible container whereby the piercing element is movable and is forced through the film of the container in contrast to the present invention wherein the piercing element 7 is held in a stationary position in a spout assembly 4 and the film is pulled into contact with the piercing element 7 whereby the film is pierced allowing liquid to flow from the container. The advantage of the present invention is that the piercing element 7 cannot pierce the opposite wall of the container or damage the wall of the container and stretching of the film is minimized and controlled since only a small portion of film is held firmly in place by being sealed to the flange of the spout 5 and to the bottom of the threaded plug 3.

Filling of flexible containers such as the ones used in bag-in-box systems may be performed on any suitable aseptic filler known to those skilled in the art, and is typically performed using commercial packaging systems such as, for example, the Liqui-Box™ Filler Model 2000C1T-A (not shown). Before filling and aseptic packaging, the container or pouch is supplied to the packaging system in a state where the inside of the container has been pre-sterilized using Cobalt gamma irradiation or any other suitable means of sterilization. The spout assembly 4, threaded plug 3, the threaded collar 2, valve body 10 and assembly 12, 13, 14 and 15 are also sterilized using Hydrogen Peroxide ($H_2O_2$), steam or any other suitable means. Once the container has been filled with a flowable material, the spout and the threaded plug 3 are hermetically bonded to the film of a pouch or container. The remainder of the fitment assembly is added and the container is provided to the customer and the container is only opened when the contents of the container are needed.

Since these containers are typically intended for one-time use and are discarded once the contents of such containers have been completely dispensed, it is preferable that the fitment assembly for use in such systems be easy to manufacture, inexpensive, easy to install and use, and recyclable. It is also important that the components are of sufficient quality and robustness. Accordingly, the construction of the components required to produce the piercing fitment assembly of the present invention is relatively simple and economical. The spout 4 and piercing element positioned therein, threaded collar 2, threaded plug 3, valve body 10 and related assembly and any fluid transfer device can all be produced from commonly used and recyclable thermoplastic materials and formed using conventional plastic injection molding processes. For example, the threaded collar and plug may preferably be made using a blend of 85% medium density linear low density polyethylene (LDPE) and 15% high density polyethylene (HDPE). The fluid transfer device may be produced using high density polyethylene (HDPE) or polypropylene (PP). Alternatively, the fluid transfer device may be made using a commercially available low density polyethylene.

Thinner regions of injection molded parts typically impose challenges with respect to suitable mold and process design for injection molding. The specific configuration of such a mold would be apparent to one skilled in the art.

From the foregoing description, it can be seen that the present invention comprises a front pull piercing valve assembly which is used with flexible containers. It will be appreciated by those skilled in the art that obvious changes can be made to the embodiments described in the foregoing description without departing from the broad inventive concept thereof. It is understood, therefore, that this invention is not limited to the particular embodiments disclosed, but is intended to cover all obvious modifications thereof which are within the scope and the spirit of the invention as defined by the claims.

PARTS LIST FOR FIGS. 1-3

1. Aseptic front pull valve piercing assembly
2. Threaded collar
3. Threaded plug
4. Spout assembly
5. Sealing Flange of spout
6. Bottom surface of flange 5
7. Piercing element
7A. Point of piercing element
8. Central opening of spout
9. Annual edge of threaded plug 3
10. Valve body
11. Exit opening in valve body
12. Interior fitment of valve body
13. Valve seat
14. Valve stem
15. Valve actuator
16. Handle
17. Cap

What is claimed:

1. A method of assembling a front pull piercing assembly for a flexible container containing a liquid, the method comprising:
    sealing a threaded plug at its bottom to a film of the flexible container;
    fitting a threaded exterior of the threaded plug into a through internal passage of a spout assembly, the spout assembly having a sealing flange sealed to the film of the flexible container;
    positioning a threaded collar having a threaded longitudinal internal passage in the internal passage of the spout assembly;
    threadably engaging the threaded collar with the threaded exterior of the threaded plug;
    positioning a circular piercing element within the through internal passage of the spout assembly such that the circular piercing element is engaged with the threaded interior of the collar, the circular piercing element having a circular piercing end with at least one piercing point transversely positioned in the longitudinal passage in close proximity to the film of the flexible container; and
    disposing a valve body centrally within the threaded collar, the valve body having an outlet opening for dispensing liquid from the flexible container, an interior fitment having a valve that allows for flow of liquid from the flexible container when in an open position and forms a seal to prevent air from contacting liquid in the valve body and the flexible container when in the closed position, and a valve actuator having a valve stem for opening and closing the valve,
    wherein the threaded collar is configured to be moved such that when the threaded collar is moved, the threaded plug moves away from the film, thereby bringing the piercing end of the piercing element into engagement with the film and piercing the film to allow the liquid from the flexible container to flow out of the container and through the longitudinal interior of the spout assembly and into the valve body, wherein when the valve is in the open position, fluid is allowed to flow through the outlet opening of the valve body.

2. The method of claim 1, further comprising providing the flexible container configured to receive a liquid to be dispensed.

3. The method of claim 2, further comprising introducing the liquid into the flexible container.

4. The method of claim 1, wherein the piercing element includes 3-10 piercing points.

5. The method of claim 1, wherein the flexible container is comprised within a rigid container.

6. The method of claim 1, wherein the flexible container is an aseptically filled container for liquids sensitive to oxygen.

* * * * *